(12) United States Patent
Zisimopoulos et al.

(10) Patent No.: US 11,700,544 B2
(45) Date of Patent: *Jul. 11, 2023

(54) COMMUNICATING OVER MULTIPLE RADIO ACCESS TECHNOLOGIES (RATS)

(71) Applicant: INTELLECTUAL VENTURES II LLC, Wilmington, DE (US)

(72) Inventors: Haris Zisimopoulos, London (GB); Chandrika K. Worrall, Newbury (GB); Alan Edward Jones, Calne (GB)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,768

(22) Filed: Sep. 16, 2022

(65) Prior Publication Data

US 2023/0016225 A1    Jan. 19, 2023

Related U.S. Application Data

(63) Continuation of application No. 17/403,448, filed on Aug. 16, 2021, now Pat. No. 11,470,503, which is a
(Continued)

(51) Int. Cl.
*H04W 76/40*      (2018.01)
*H04L 67/14*      (2022.01)
(Continued)

(52) U.S. Cl.
CPC ......... *H04W 28/0289* (2013.01); *H04L 67/14* (2013.01); *H04W 76/40* (2018.02); *H04W 88/06* (2013.01); *H04W 88/16* (2013.01)

(58) Field of Classification Search
CPC . H04W 88/06; H04W 28/02; H04W 28/0289; H04W 76/40; H04W 88/16; H04L 67/14
See application file for complete search history.

(56) References Cited

U.S. PATENT DOCUMENTS

| 6,778,556 B1 | 8/2004 | Chin et al. |
| 7,162,245 B2 | 1/2007 | Treillard |

(Continued)

FOREIGN PATENT DOCUMENTS

| EP | 1148671 | 10/2001 |
| EP | 1158828 | 11/2001 |

(Continued)

OTHER PUBLICATIONS

"3rd Generation Partnership Project; Technical Specification Group Services and System Aspects; Multimedia Broadcast/Multicast Service (MBMS); Architecture and Functional Description (Release 6)," (Jun. 2006). 3GPP: Valbonne, France, TS 23.246 v6.10.0: 1-46.

(Continued)

*Primary Examiner* — Jinsong Hu
*Assistant Examiner* — Farideh Madani
(74) *Attorney, Agent, or Firm* — Volpe Koenig (57) ABSTRACT

A user equipment (UE) may transmit, using a first radio access technology (RAT), a service request message including information associated with at least one UE service. Based on the transmitted service request message, a message with information to setup a bearer for a second RAT, wherein the second RAT is a different RAT than the first RAT. The UE may receive multimedia data using the second RAT and simultaneously receive data using the first RAT.

16 Claims, 6 Drawing Sheets

Related U.S. Application Data continuation of application No. 16/842,150, filed on Apr. 7, 2020, now Pat. No. 11,096,085, which is a continuation of application No. 16/113,446, filed on Aug. 27, 2018, now abandoned, which is a continuation of application No. 15/131,264, filed on Apr. 18, 2016, now Pat. No. 10,064,092, which is a continuation of application No. 14/016,559, filed on Sep. 3, 2013, now Pat. No. 9,319,930, which is a continuation of application No. 11/502,929, filed on Aug. 11, 2006, now Pat. No. 8,532,653.

(51) Int. Cl.
*H04W 88/06* (2009.01)
*H04W 28/02* (2009.01)
*H04W 88/16* (2009.01)

(56) References Cited

U.S. PATENT DOCUMENTS

| | | | |
|---|---|---|---|
| 7,239,632 | B2 | 7/2007 | Kalavade et al. |
| 8,532,653 | B2 | 9/2013 | Zisimopoulos et al. |
| 9,319,930 | B2 | 4/2016 | Zisimopoulos et al. |
| 11,470,503 | B2 * | 10/2022 | Zisimopoulos ......... H04L 67/14 |
| 2002/0049062 | A1 | 4/2002 | Petersen |
| 2002/0090974 | A1 | 7/2002 | Hagn |
| 2003/0002446 | A1 | 1/2003 | Komaili et al. |
| 2003/0055554 | A1 | 3/2003 | Shioda et al. |
| 2004/0147262 | A1 * | 7/2004 | Lescuyer .......... H04W 36/0085 455/435.2 |
| 2004/0252659 | A1 * | 12/2004 | Yun ...................... H04W 76/10 370/328 |
| 2005/0026615 | A1 | 2/2005 | Kim |
| 2005/0026616 | A1 * | 2/2005 | Cavalli ............ H04W 36/0085 455/439 |
| 2005/0075077 | A1 | 4/2005 | Mach et al. |
| 2005/0141450 | A1 | 6/2005 | Carlton et al. |
| 2005/0254469 | A1 | 11/2005 | Verma et al. |
| 2006/0030312 | A1 | 2/2006 | Han et al. |
| 2006/0036741 | A1 | 2/2006 | Kiss et al. |
| 2007/0155344 | A1 * | 7/2007 | Wiessner ............... H04B 1/006 455/78 |
| 2007/0243872 | A1 | 10/2007 | Gallagher et al. |
| 2009/0111458 | A1 | 4/2009 | Fox et al. |
| 2010/0210266 | A1 | 8/2010 | Laroia et al. |

FOREIGN PATENT DOCUMENTS

| | | | |
|---|---|---|---|
| EP | 1207713 | | 5/2002 |
| EP | 1257141 | | 11/2002 |
| EP | 1392075 | | 2/2004 |
| EP | 1420604 | | 5/2004 |
| EP | 1503606 | | 2/2005 |
| EP | 1303968 | B1 * | 11/2006 ............ H04L 63/06 |
| EP | 1753253 | | 2/2007 |
| GB | 2407947 | | 5/2005 |
| JP | 2005523595 | | 8/2005 |
| WO | 98/57482 | | 12/1998 |
| WO | 02/03728 | | 1/2002 |
| WO | 02/7345 | | 1/2002 |
| WO | WO-0215620 | A1 * | 2/2002 ............ H04W 24/02 |
| WO | 04/002184 | | 12/2003 |

OTHER PUBLICATIONS

"3rd Generation Partnership Project; Technical Specification Group Services and System Aspects; Multimedia Broadcast/Multicast Service (MBMS); Protocols and Codecs (Release 6)," (Jun. 2006). 3GPP: Valbonne, France, TS 26.346 v6.5.0: 1-120.
"3rd Generation Partnership Project; Technical Specification Group Core Networks; Multimedia Broadcast/Multicast Service (MBMS); CN1 Procedure Description (Release 6)," (Sep. 2004). 3GPP Valbonne, France, TR 29.846 v6.0.0: 1-33.
"3rd Generation Partnership Project; Technical Specification Group Services and System Aspects; 3G Security; Security of Multimedia Broadcast/Multicast Service (Release 6)," (Jun. 2006). 3GPP: Valbonne, France, TS 33.246 v6.7.0: 1-58.
"3rd Generation Partnership Project; Technical Specification Group Radio Access Network; Introduction of the Multimedia Broadcast Multicast Service (MBMS) in the Radio Access Network (RAN); Stage 2 {Release 6)," {Jun. 2006). 3GPP: Valbonne, France, TS 25.346 v6.8.0: 1-59.
"3rd Generation Partnership Project; Technical Specification Group Services and System Aspects Telecommunication Management; Charging Management; Charging Architecture and Principles (Release 6)," KSeptember 2005). 3GPP: Valbonne, France, TS 32.240 v6.3.0: 1-39.
"3rd Generation Partnership Project; Technical Specification Group Core Network and Terminals; General Packet Radio Service (GPRS); GPRS Tunneling Protocol (GTP) across The Gn and Gp Interface (Release 6)," (Jun. 2006). 3GPP: Valbonne, France, TS 29.060 v6.13.0: 1-146.
"3rd Generation Partnership Project; Technical Specification Group Services and System Aspects; One Tunnel Functional Description; (Release 7)," (Jul. 2006). 3GPP: Valbonne, France, TR 23.809 v0.3.0:1-36.
"3rd Generation Partnership Project; Technical Specification Group Services and System Aspects; LCS Architecture for 3GPP Interworking WLAN; Release 7," (Jun. 2006). 3GPP: Valbonne, France, TR 23.837 v0.3.0:1-16.
"3rd Generation Partnership Project; Technical Specification Group Services and System Aspects; General Packet Radio Service (GPRS); Service Description; Stage 2 (Release 6)" (Sep. 2003). 3GPP Valbonne, France, TS 23.060 v6.2.0: 1-209.
"3rd Generation Partnership Project; Technical Specification Group Core Network and Terminals; Mobile Radio interface Layer 3 Specification; Core Network Protocols; Stage 3 (Release 6)," (June 200~ 3GPP: Valbonne, France, TS 24.008 v6.13.0:1-526.
"3rd Generation Partnership Project; Technical Specification Group Radio Access Network; Radio Resource Control (RRC); Protocol Specification (Release 6)," (Jun. 2006).3GPP: Valbonne, France, TS 25.331 v6.10.0:1-1226.
Chinese Patent Application No. 200780034620.5; Notification of First Office Action dated Jan. 26, 2011 (with English translation).
Chinese Patent Application No. 200780034620.5; Notification of Second Office Action dated Jan. 6, 2012 (English translation).
Communication Pursuant to Article 94(3) EPC from European Patent Application No. 07 802 542.6-2416 dated Jan. 26, 2010.
Deering, S. et al. (Oct. 1999). "Multicast Listener Discovery (MLD) for 1Pv6," RFC 2710, located at <http://www.ietf.org/rtc/rtc2710.txt> visited on Aug. 8, 2007. (20 pages).
European Patent Application No. 10 172 739.4-2414; Communication Pursuant to Article 94(3) EPC; dated Sep. 30, 2011.
European Patent Application No. 10 172 739.4-2414; Communication Pursuant to Article 94(3) EPC; dated Jul. 12, 2011.
European Patent Application No. EP 10 17 2739; European Search Report dated Oct. 7, 2010.
Fenner, W. (November 1997). "Internet Group Management Protocol, Version 2," RFC 2236, located at <http://www.ietf.org/rtc/rtc2236.txt> visited on Aug. 8, 2007. (22 pages).
Final Rejection, U.S. Appl. No. 11/502,929, dated Mar. 16, 2010.
Final Rejection, U.S. Appl. No. 14/016,559, dated Oct. 9, 2015.
Final Rejection, U.S. Appl. No. 15/131,264, dated Feb. 16, 2017.
Final Rejection, U.S. Appl. No. 16/113,446, dated Jun. 11, 2019.
Final Rejection, U.S. Appl. No. 16/842,150, dated Oct. 23, 2020.
Final Rejection, U.S. Appl. No. 17/403,448, dated Mar. 15, 2022.
International Search Report and Written Opinion dated Oct. 29, 2007, for PCT Application No. PCT/EP2007/058241 filed Aug. 8, 2007, 14 pages.
Japanese Patent Application No. 2009-523290; Translation of an Office Action; dated Aug. 29, 2011.
Korean Patent Application No. 10-2009-7004889; Notice of Final Rejection; dated Oct. 24, 2011 (Translation).
Korean Patent Application No. 10-2009-7004889; Notice Requesting Submission of Opinion; dated Dec. 1, 2010 (Translation).

(56) References Cited

OTHER PUBLICATIONS

Mari Sendaim PRNewswire article at REDORBIT, pp. 1-2, published Nov. 10, 2005; Retrieved on Jun. 3, 2009 from online link http://redorbit.com/news/display/?id=301591.
Non-Final Rejection, U.S. Appl. No. 17/403,448, dated Dec. 7, 2021.
Non-Final Rejection, U.S. Appl. No. 11/502,929, dated Jun. 4, 2009.
Non-Final Rejection, U.S. Appl. No. 14/016,559, dated Mar. 26, 2015.
Non-Final Rejection, U.S. Appl. No. 15/131,264, dated Aug. 10, 2016.
Non-Final Rejection, U.S. Appl. No. 15/131,264, dated Sep. 8, 2017.
Non-Final Rejection, U.S. Appl. No. 16/113,446, dated Nov. 30, 2018.
Non-Final Rejection, U.S. Appl. No. 16/842,150, dated May 28, 2020.
Notice of Allowance, U.S. Appl. No. 11/502,929, dated May 15, 2013.
Notice of Allowance, U.S. Appl. No. 14/016,559, dated Dec. 15, 2015.
Notice of Allowance, U.S. Appl. No. 15/131,264, dated Apr. 23, 2018.
Notice of Allowance, U.S. Appl. No. 16/842,150, dated Apr. 14, 2021.
Notice of Allowance, U.S. Appl. No. 17/403,448, dated Jun. 24, 2022.
Office Action, Australian Application No. 2007283553, dated Jul. 19, 2010.
Office Action, Korean Application No. 10-2009-7004889, dated Mar. 26, 2012.
Search Report, European Patent Application No. 16188102.4-1854/3136810 (dated Feb. 1, 2017).

\* cited by examiner

COMMUNICATING OVER MULTIPLE RADIO ACCESS TECHNOLOGIES (RATS)

CROSS REFERENCE TO RELATED APPLICATION

This application is a continuation of U.S. patent application Ser. No. 17/403,448, filed Aug. 16, 2021, which is a continuation of U.S. patent application Ser. No. 16/842,150, filed Apr. 7, 2020, which issued as U.S. Pat. No. 11,096,085 on Aug. 17, 2021, which is a continuation of U.S. patent application Ser. No. 16/113,446, filed Aug. 27, 2018, now abandoned, which is a continuation of U.S. patent application Ser. No. 15/131,264, filed Apr. 18, 2016, which issued as U.S. Pat. No. 10,064,092 on Aug. 28, 2018, which is a continuation of U.S. patent application Ser. No. 14/016,559, filed Sep. 3, 2013, which issued as U.S. Pat. No. 9,319,930 on Apr. 19, 2016, which is a continuation of U.S. patent application Ser. No. 11/502,929, filed Aug. 11, 2006, which issued as U.S. Pat. No. 8,532,653 on Sep. 10, 2013, which is incorporated by reference as if fully set forth.

BACKGROUND OF INVENTION

Mobile operators worldwide have launched streaming real-time services (such as mobile TV and radio) over their existing 3G Universal Mobile Telecommunications System (UMTS) networks. However, the existing UMTS air-interface and overall network architecture are not adequate to deliver high quality, bandwidth-demanding multimedia content, such as television for a large number of users. Consequently, the 3GPP standards consortium identifies optimizations in the UTRAN and the core network system architecture that will allow the deployment of broadcasting-type applications over a UMTS air-interface and core network.

The add-on framework to the UMTS system architecture in a family of 3GPP specifications is called Multimedia Multicasting/Broadcasting Service (MBMS). The MBMS framework identifies the modifications needed in the UMTS Radio Access Network (RAN) and describes service aspects, such as security and charging in a set of 3GPP specifications (see, for example, references [1], [2], [4], [8]). 3GPP2 has defined a similar service in a family of specifications called Broadcast Multicast Service (BCMCS).

MBMS/BCMCS represents a point-to-multipoint service architecture defined in an end-to-end manner within the family of 3GPP/2 specifications that allow a 3G operator to deploy a broadcasting/multicasting service. For example, Mobile TV is deployed over its allocated spectrum by upgrading the existing network with the relevant 3GPP2 MBMS/BCMCS specifications.

MBMS/BCMCS multimedia streaming traffic and the associated uplink/downlink signaling are conventionally transmitted from the same network on the same frequency band. Because MBMS is intended to serve a large user population, the high volume of broadcast/multicast traffic and the number of processing nodes along its path impose a significant performance strain on the existing core network and UTRA elements of the UMTS network. For example, the core network mobility anchor (e.g., SGSN in 3GPP UMTS), and the radio network controller (e.g., RNC in 3GPP UMTS) must process and transport the "normal" point-to-point traffic generated by the different packet and circuit-switched applications. Therefore, a way to reduce the strain on the network is desired.

BRIEF SUMMARY OF THE INVENTION

Embodiments of the invention provide methods and apparatus to alleviate potential capacity problems in the radio access and core networks operating MBMS by separating the control and user plane of the MBMS traffic (a "one tunnel" approach) across two different Radio Access Technologies (RAT) of the 3GPP family of RATs, and their equivalent Core Network transport path.

Overload traffic conditions for multimedia services may be reduced by transmitting the traffic related to broadcasting multimedia over a first wireless network (defined by one RAT), and the associated control information over a second wireless network (defined by a substantially different RAT). The two networks may operate on substantially different frequency bands. Thus, the wireless terminal may receive a plurality of signals originating from a plurality networks.

A mobile operator may have both a paired and an unpaired spectrum. In the unpaired spectrum, the mobile radio technology may use Time Division Duplexing (TDD). In the paired spectrum, the mobile radio technology may use Frequency Division Duplexing (FDD). The multicast traffic is highly asymmetric. Thus, the multicast traffic is adequately matched to the unpaired spectrum, in which the ratio of downlink to uplink traffic may be adjusted to reflect the traffic demand. Moreover, the ratio may be adjusted such that the entire unpaired spectrum is dedicated to downlink. In this way, maximum utilization of the available spectrum is achieved. Under this scenario, the return channel is no longer present in the unpaired spectrum, and the user relies on the paired spectrum to provide the return channel.

More particularly, embodiments of the invention separate the paths of the multicasting/broadcasting traffic across multiple access and core networks into Control Plane (CP) and User Plane (UP) multicasting/broadcasting traffic. UP multicasting/broadcasting traffic is the actual multimedia content delivered in the downlink. CP is the supplemental traffic that is associated with the UP multicasting/broadcasting traffic. Both the UP and CP are relevant to network-specific signaling procedures and "higher-layer" application-related signaling that applies to the multicasting/broadcasting user service.

The coupling between a first network and a second network by a home gateway allows for a direct tunnel transmission from a broadcast/multicast service center to a user equipment. User equipment (UE) may transmit control uplink signals via the first network. Simultaneously, the UE receives downlink control signals via the first network. The broadcast multimedia service is received at the user equipment via a second network in response to the exchange of uplink and downlink signals between the user equipment and the first network through the home gateway.

DETAILED DESCRIPTION OF THE INVENTION

Figure 1:
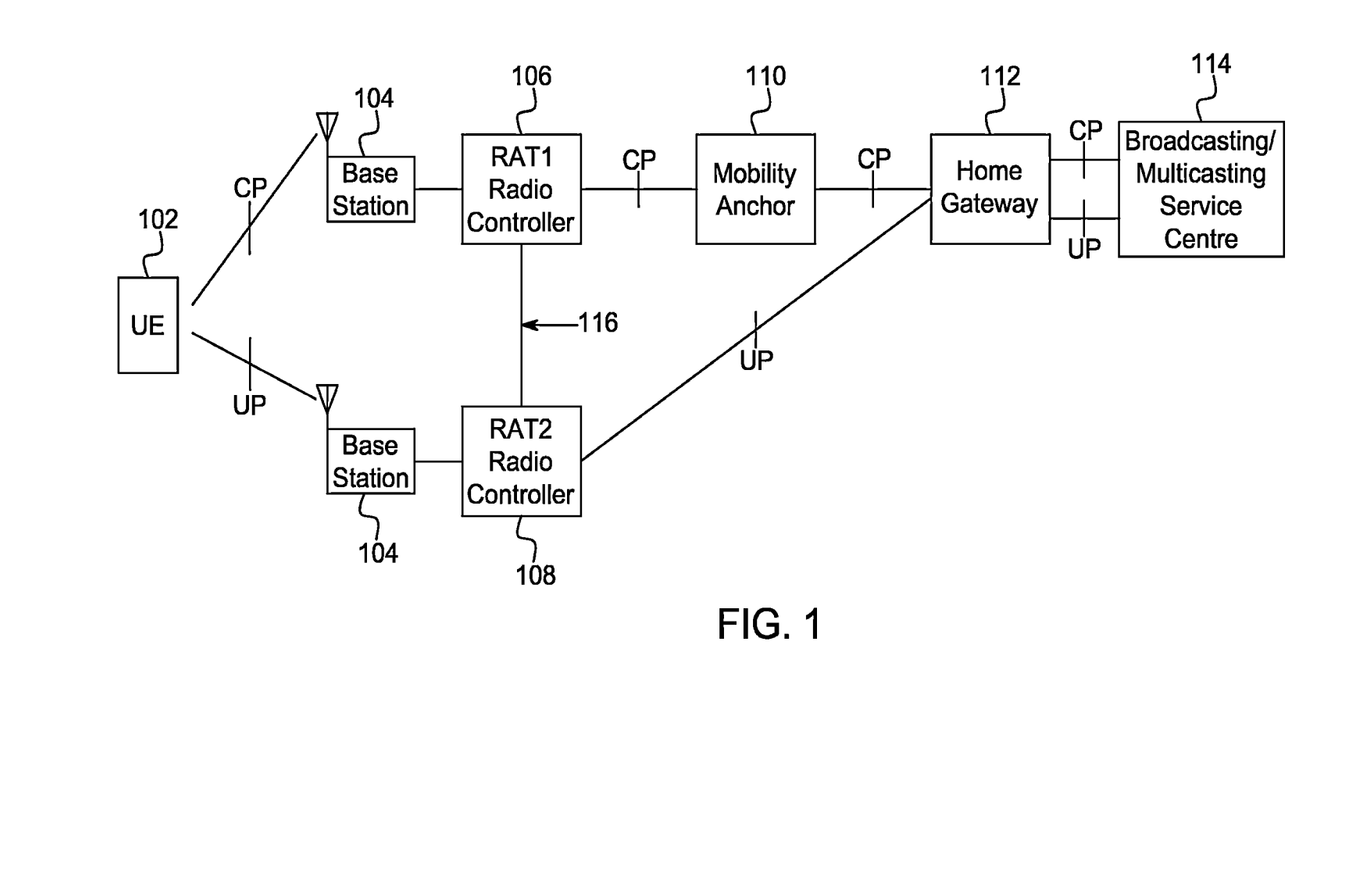
FIG. 1 illustrates an exemplary embodiment of logical architecture of a network with Multimedia Multicasting/Broadcasting Service (MBMS) capabilities.

FIG. 1 illustrates an exemplary embodiment of the logical architecture of a network with a point-to-multipoint service center (e.g., an MBMS service center). A first network is defined by RAT1, and a second network is defined by RAT2. Each RAT is implemented by a radio controller (e.g., RAT1 radio controller 106 and RAT2 radio controller 108). The radio controller (RC) is the control element in the radio access network (RAN) responsible for controlling the base stations 104 of a specific RAT. The RC carries out radio resource and mobility management functions. This is the point in the network where encryption may be done before user data is sent to and from the mobile UE 102.

The UE 102 communicates with RAT1 and RAT2 via base stations 104 coupled to the RAT1 RC 106 and RAT2 RC 108. The UE wireless terminal 102 includes a first receiver, a second receiver, and a transmitter. The UE 102 may receive signals simultaneously from RAT1 and from RAT2. In other words, the first receiver may receive signals over two different networks, which may operate in different frequency bands.

The mobility anchor 110 is the gateway between the RAN and the core network. Mobility anchoring is performed when the UE 102 is moving across a RC of the same or different RATs.

The home gateway 112 is a router that serves as a gateway between mobile networks and packet data networks. It is the ingress/egress point for the data traffic entering/exiting the mobile core network, respectively. For the case of MBMS, the home gateway 112 terminates the IP multicast request and controls the flow of the IP multicast traffic in the core network.

The UE 102 uses RAT1 to transport the necessary control plane (CP) data. The CP data includes radio and core network signaling data, service registration data, and security-related signaling that is used to deliver the necessary decryption keys from the Broadcasting/Multicasting Service Center (BM-SC) 114 to the UE 102.

The BM-SC 114 is the network entity that manages the functions of subscription management, user authentication, key distribution, and multimedia content delivery. The BM-SC 114 provides functions for broadcasting user service provisioning and delivery. It serves as an entry point for broadcasting traffic transmissions, and authorizes and initiates the establishment of broadcasting traffic transport bearers. It also distributes the service announcements that schedule the delivery of a broadcasting service.

The home gateway 112 directly transmits the broadcasting/multicasting user plane (UP) traffic to the RAT2 RC 108 via controlling nodes, thereby bypassing the mobility anchor 110.

This approach removes the signaling and processing load from the nodes involved in the delivery of broadcast multimedia traffic, and leaves the capacity of the most widely deployed RAT (in this example, RAT1) unaffected.

UE mobility between the two RATs is supported over an interface 116 between the RAT1 RC 106 and RAT2 RC 108. The coverage of RAT1 may be larger than that of RAT2. Thus, when UE 102 is no longer in the coverage area of RAT2, a request to handover the multimedia transmission is made to RAT1 using messages communicated between the UE 102 and RAT1 RC 106 and RAT2 RC 108. The handover messages are similar to well-known conventional handover messages [14], but contain modified handover parameters. The UE 102 informs the RAT1 RC 106 that there is a loss of service over RAT2. The message may include additional parameters such as a cause value indicating that the handover is initiated due to the loss of MBMS reception over RAT2, and the MBMS service ID (or MBMS service IDs if more than one service is activated). The RAT1 RC 106 communicates with RAT2 RC 108 (over an interface between the two RCs 116) to acquire the service context for the particular service that the UE 102 has activated. After establishing the service context at RAT1 RC 106, the RAT1 RC 106 sends the radio channel setup information to the UE 102 in order to enable the delivery of the service over RAT1.

Figure 2:
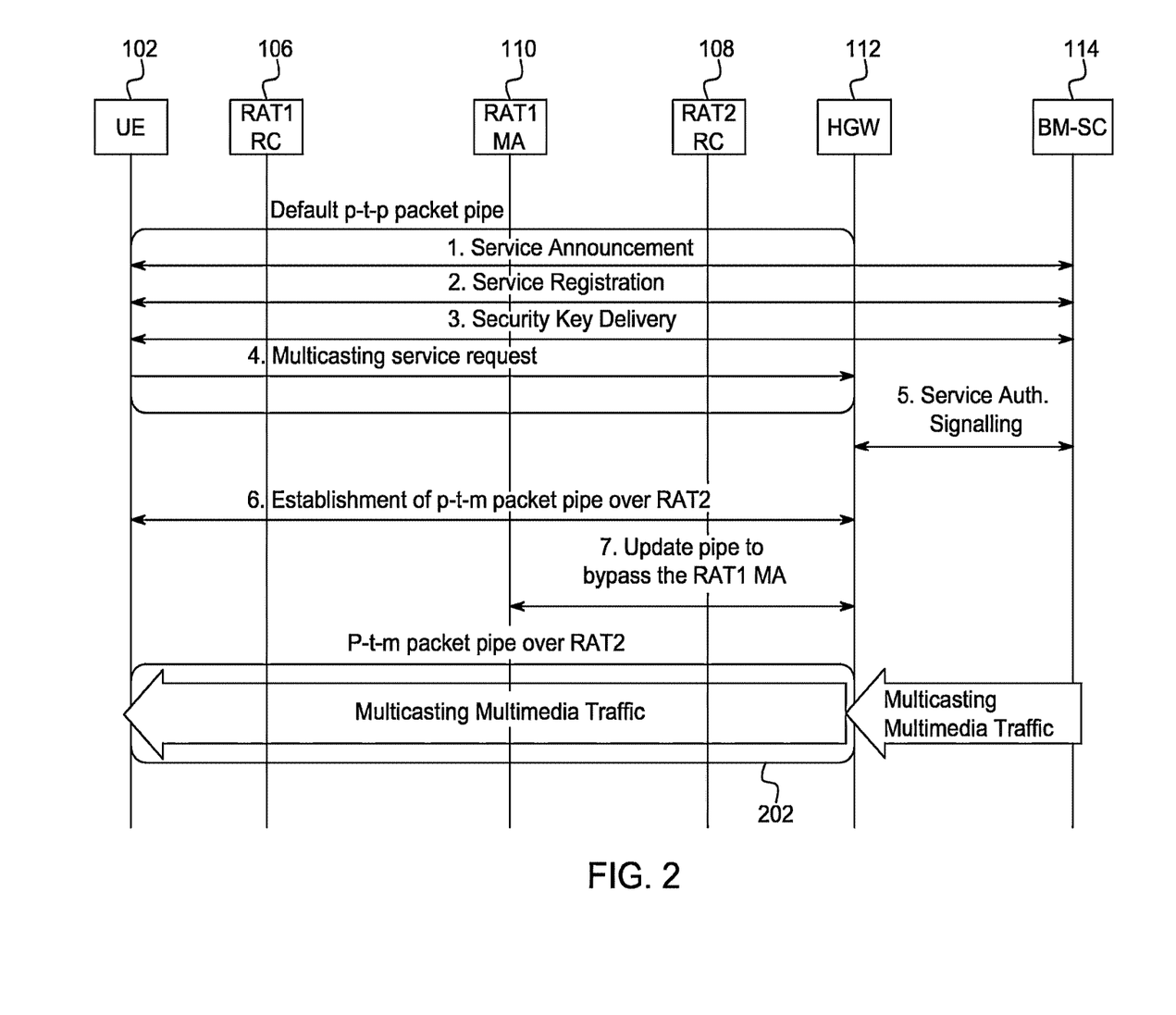
FIG. 2 illustrates an exemplary embodiment of the signaling flow to establish a direct user plane tunnel for the delivery of multicasting traffic.

FIG. 2 illustrates an exemplary embodiment of signaling flow between elements in a mobile network to direct a user plane tunnel for the delivery of multicasting traffic. The following process follows the establishment of a point-to-point packet pipe by the UE 102. The messages between elements in steps 1-4 are "application layer" signaling messages.

In step 1, the UE 102 receives the service announcement message transmitted by the BM-SC 114. The service announcement message indicates the details of the broadcasting/multicasting service.

In step 2, the UE 102 communicates signaling messages with the BM-SC 114 over a first wireless network, RAT1, to perform the service registration request.

In step 3, the UE 102 communicates with the BM-SC 114 via signaling messages to request and receive the necessary security keys via RAT1. The security keys are needed to decrypt the received content.

In step 4, the UE 102 communicates signaling messages to join the multicasting service. The messages are intercepted by the home gateway (HGW) 112.

In step 5, the home gateway 112 requests and receives authorization from the BM-SC 114 for the UE 102 to allow access to the multicasting service.

In step 6, after the accepted authorization is received from the BM-SC 114 at the home gateway 112, the home gateway 112 proceeds to receive and establish a point-to multipoint program called a point-to-multipoint packet pipe 202 over RAT2.

In step 7, after the point-to-multipoint pipe 202 is established in step 6, the home gateway 112 updates the termination point of the point-to-multipoint pipe 202 in order to bypass the RAT1 Mobility Anchor (MA) 110 from the path of the user plane traffic. The point-to-multipoint service, called the point-to-multipoint packet pipe 202, transports the multicasting multimedia traffic via the second network, and terminates at the RAT2 RC 108.

After the establishment of the point-to-multipoint packet pipe 202 over RAT2, the multicasting multimedia traffic is directly transmitted from the home gateway 112 to the RAT2 RC 108. From the RAT2 RC 108, the multicasting multimedia traffic is transmitted to the UE 102.

The above embodiments can be implemented in the Rel.6 3GPP network architecture with some enhancements. For example, using two different RATs, W-CDMA radio network controllers may be used to transport the MBMS signaling information. W-CDMA is FDD-based. At the same time, TD-CDMA RNCs may be used in the downlink-only mode to transport the MBMS multimedia traffic. TD-CDMA is TDD-based. In another embodiment, the two RATs may be W-CDMA RNCs. In another embodiment, the two RATs may be TD-CDMA RNCs.

Figure 3:
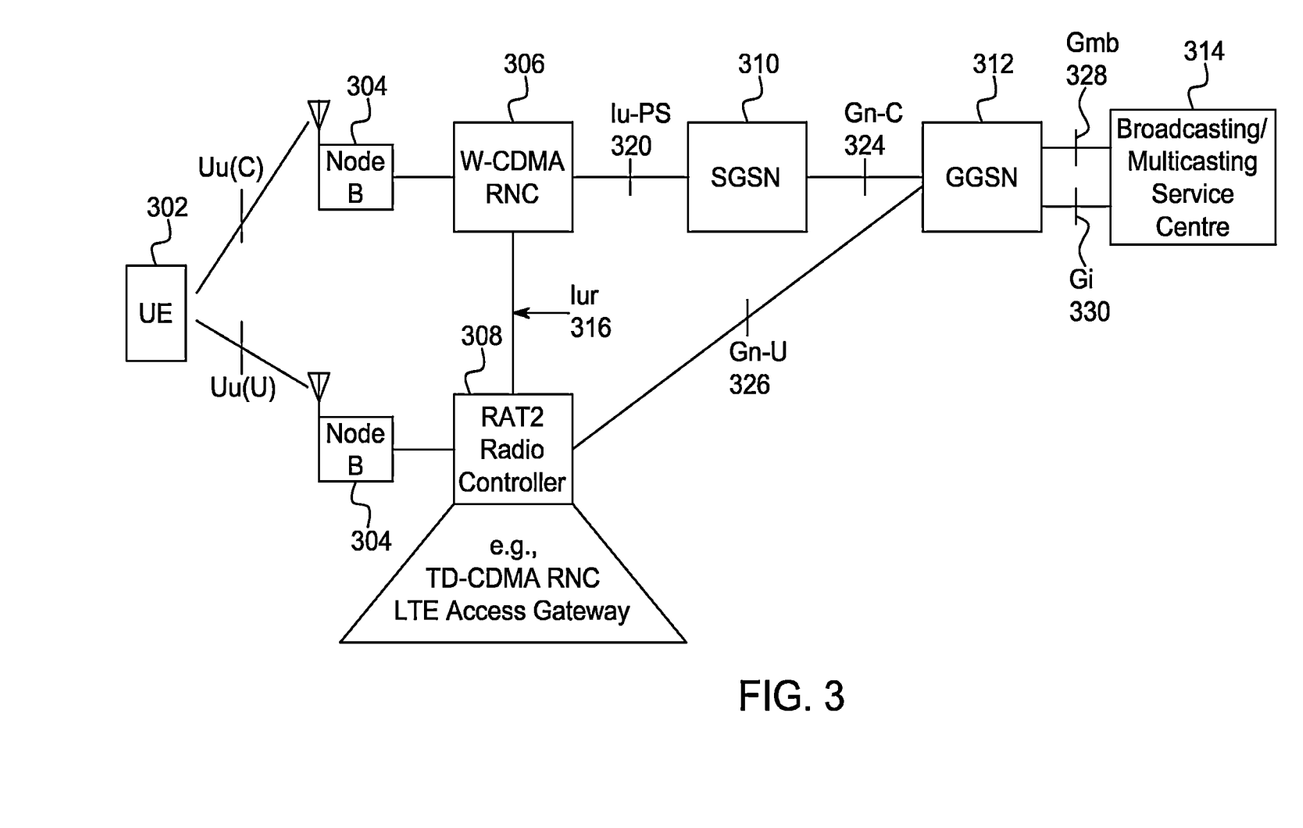
FIG. 3 illustrates an exemplary embodiment of a UMTS network with Multimedia Multicasting/Broadcasting Service (MBMS) capabilities.

FIG. 3 illustrates an embodiment using UMTS technology. The UE 302 communicates with a W-CDMA radio network controller (RNC) 306, which defines a first network, and a TD-CDMA RNC 308, which defines a second network, via node Bs 304. The first network communicates uplink and downlink control signals to the UE 302. The second network transmits a point-to-multipoint signal to the UE 302 in response to the uplink and downlink control signals between the first network and the UE 302. (Node B 304 is the base station for the UMTS cellular system.)

The mobility anchor for the UMTS core network (W-CDMA) is the SGSN 310. The interface, Iu-PS 320, links the W-CDMA RNC 306 with an SGSN 310.

The home gateway for the UMTS core network is the GGSN 312. The GGSN 312 couples the point-to-multipoint service center, the BM-SC 314, with the first and second wireless networks.

The interface, Gn, links the SGSN 310 and GGSN 312 core network nodes. The Gn is separated into Gn-C 324 and Gn-U 326: Gn-C 324 indicates the transport of the control plane messages, such as those referring to the user plane tunnel establishment and mobility messages; and Gn-U 326 indicates the user plane traffic transport. The Gn interface (Gn-C 324 and Gn-U 326), in prior art, connect the same nodes (e.g., same RNC and SGSN). In the embodiments of the invention, however, the Gn-C 324 terminates in the W-CDMA RNC 306, compared to the Gn-U 326, which terminates in the TD-CDMA RNC 308.

Two interfaces exist between the GGSN 312 and the BM-SC 314. The Gmb 328 is a MBMS-specific interface. It is used for signaling message exchanges between GGSN 312 and BM-SC 314. A signaling message exchange may include user-specific signaling (such as user-specific charging messages) and MBMS-specific signaling messages (such as the GGSN registration in a BM-SC). The Gi interface 330 is located between the GGSN 312 and the external public packet data network. In the embodiments of the invention, Gi 330 connects the BM-SC 314 and the GGSN 312. Gi 330 transports the UP multimedia traffic to the GGSN 312 designated to receive the MBMS user service.

The Iur 316 interface is located between two RNCs. In an exemplary embodiment, the Iur 316 may connect two RNCs of the same RAT (e.g., W-CDMA or TD-CDMA). In other embodiments of the invention, the Iur 316 may connect two RNCs of different RATS, for example, a W-CDMA RNC and a TD-CDMA RNC. The Iur interface 316 may transfer a downlink channel setup request from the first RNC to a second RNC, and a downlink channel acknowledgment from the second RNC to the first RNC. An embodiment of a specific signaling exchange between the RNCs is shown in the signaling flow of FIG. 4 and FIG. 5.

If the MBMS service embodiment uses the broadcast delivery mode as defined in [1], the UE 302 uses the W-CDMA RNC 306 to perform service registration, authenticate with the BM-SC 314, obtain the necessary encryption keys as defined in [4], and receive the service announcement. Next, the UE 302 performs the necessary procedures to "tune in" to the appropriate MBMS traffic channel (MTCH) transmitted over the UMTS TD-CDMA air-interface in order to receive the MBMS multimedia traffic and then use the previously received keys to decrypt the traffic.

Figure 4:
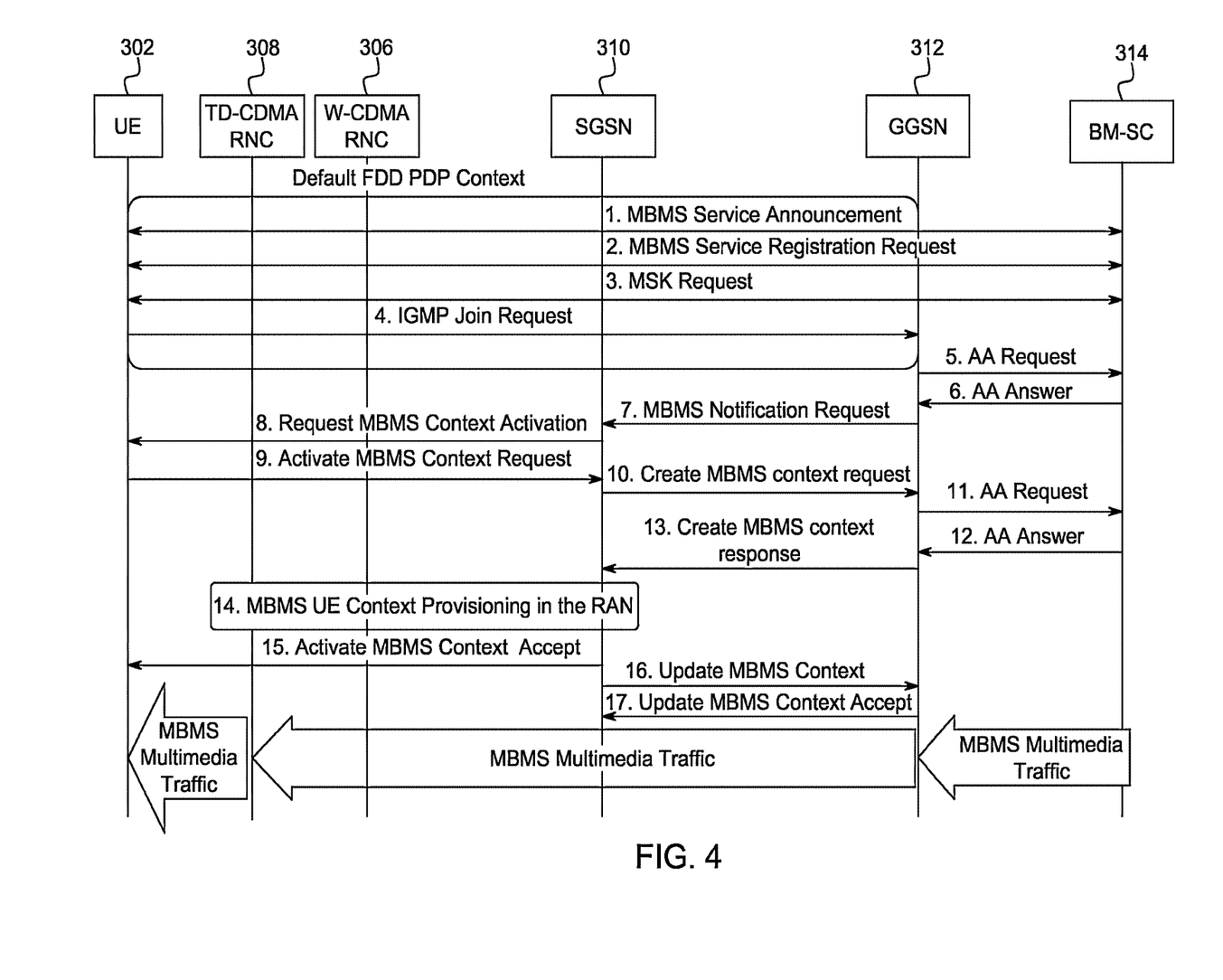
FIG. 4 illustrates an exemplary embodiment of the signaling flow for MBMS multicast delivery mode signaling procedures, using "one tunnel" approach and downlink-only TD-CDMA radio interface.

However, if the particular service uses the multicast delivery mode, then the UE may perform multicast delivery mode signaling procedures, described in [1], [4], and [5] with modifications explained in the detailed description of FIG. 4.

FIG. 4 illustrates an example of a signaling message flow that is implemented when the MBMS multicast delivery mode signaling procedures uses a "one tunnel" approach and a downlink-only TD-CDMA radio interface.

In steps 1-4, the current MBMS signaling procedures apply as described in the relevant 3GPP specifications [1], using the messages defined in [4] and [2], utilizing the default packet data protocol (PDP) context over W-CDMA bearers.

In step 1, the service announcement messages communicated between the UE 302 and BM-SC 314 indicate that the transport of the MBMS traffic will take place over the TD-CDMA network.

In step 2, the service registration request messages are communicated between the BM-SC 314 and the UE 302.

Step 3 communicates the modulation request messages between the UE 302 and the BM-SC 314.

In step 4, the UE 302 communicates messages to the BM-SC 314 indicating that it wants to receive messages addressed to a specific multicast group.

For steps 5-9, the current MBMS signaling procedures apply as described in the relevant 3GPP specifications [1], using the messages defined in [9], [10], and [11].

In steps 5-6, signaling messages between the BM-SC 314 and the GGSN 312 consist of a service authorization request from the GGSN 312 and a service authorization answer from the BM-SC 314 (AA request/answer).

In step 7, after receiving an authorization answer, the GGSN 312 sends a MBMS notification request message to the SGSN 310. In step 8, the SGSN 310 then communicates a "Request MBMS Context Activation" message to the UE 302. In step 9, the UE 302 communicates an "Activate MBMS Context Request" to the SGSN 310.

The "one tunnel approach" described in [12] and [13] indicates the reserved "not allocated" value for the traffic path as the Iu bearer is not yet allocated in the RAN.

In step 10, the message "Create MBMS Context Request" is sent from the SGSN 310 to the GGSN 312.

For steps 11-13, the current MBMS signaling procedures apply as described in the relevant 3GPP specifications [1], using the messages defined in [9] and [10].

In steps 11-12, signaling messages between the BM-SC 314 and the GGSN 312 includes a service authorization request from the GGSN 312, and a service authorization answer from the BM-SC 314 (AA request/answer).

In step 13, a "Create MBMS context response" message is sent from the GGSN 312 to the SGSN 310.

In step 14, the SGSN 310 allocates the appropriate resources in the RAN for the MBMS context by exchanging signaling information with the W-CDMA RNC 306 and the TD-CDMA RNC 308, separating the CP and UP paths over the Iu-PS interface 320 and the Iur interface 316 by a downlink channel setup request.

Figure 5:
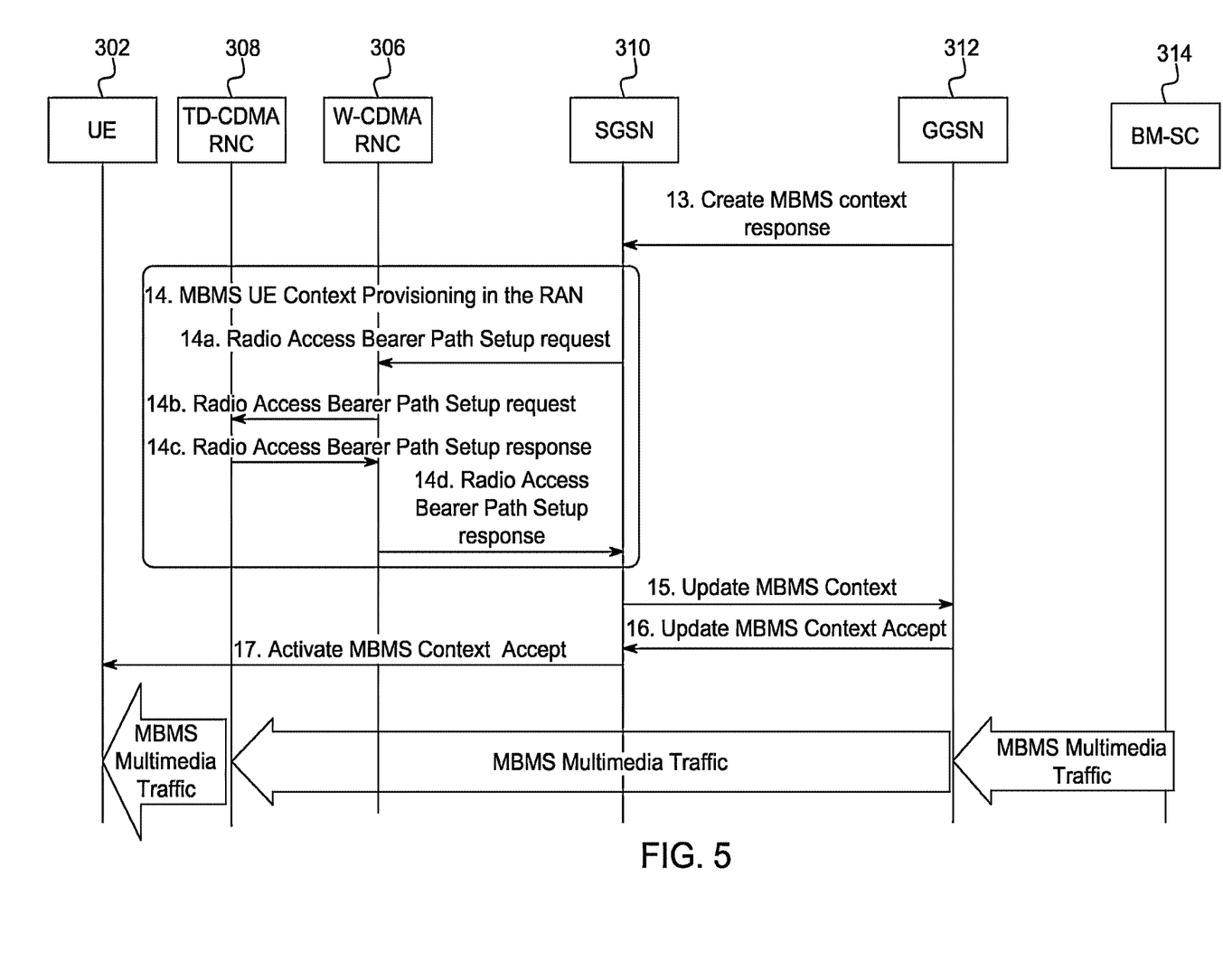
FIG. 5 illustrates an exemplary embodiment of the detailed steps involved in MBMS context provisioning in RAN with direct user plane.

FIG. 5 illustrates in more detail the MBMS context provisioning in the Radio Access Network (RAN), shown in step 14 of FIG. 4.

In step 14a, the Radio Access Bearer (RAB) path setup request is sent to the W-CDMA RNC 306 from the SGSN 310. This request includes a Tunnel Endpoint ID (TEID) of the GGSN 312 and the address of the GGSN 312.

In step 14b, the W-CDMA RNC 306 communicates the TEID and the address of the GGSN 312 to the corresponding TD-CDMA RNC 308 over an "Iur-like" interface. Also, the TD-CDMA RNC 308 is requested for RAB establishment over the TD-CDMA network by a "Radio Access Bearer Path Setup request".

In step 14c the TD-CDMA RNC 308 reserves the resources for RAB establishment and communicates to the W-CDMA RNC 306 indicating a Tunnel Endpoint ID (TEID) at the TD-CDMA RNC 308 for the RAB and the address of the TD-CDMA RNC 308 in a "Radio Access Bearer Path Setup response" message.

In step 14d, the information on TEID at TD-CDMA RNC 308 and the address of the TD-CDMA RNC 308 is delivered to the SGSN 310 from the W-CDMA RNC 306 by a "Radio Access Bearer Path Setup response" message.

In step 15, the current MBMS signaling procedures apply as described in the relevant 3GPP specification [1], using the messages defined in [9], [10], and [11]. The SGSN 310 communicates an "Update MBMS Context" signaling message to the GGSN 312.

In step 16, after the MBMS Context is provisioned in the RAN, the SGSN 310 receives an "Update MBMS Context Accept" signaling message from the GGSN 312 and updates the MBMS context indicating the RAN address and the TEID of the TD-CDMA RNC 308 to the GGSN 312.

The GGSN 312 updates the MBMS Context and returns the "Update MBMS Context Response" message. In step 17, the tunnel between the GGSN 312 and the TD-CDMA RNC 308 is established.

In embodiments of the invention, the GGSN 312 sends the MBMS user plane traffic directly to the TD-CDMA RNC 308 following the "one tunnel" approach defined in 3GPP. In this embodiment, the method indicates the MBMS transport mechanism using an element in the MBMS service announcement format.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
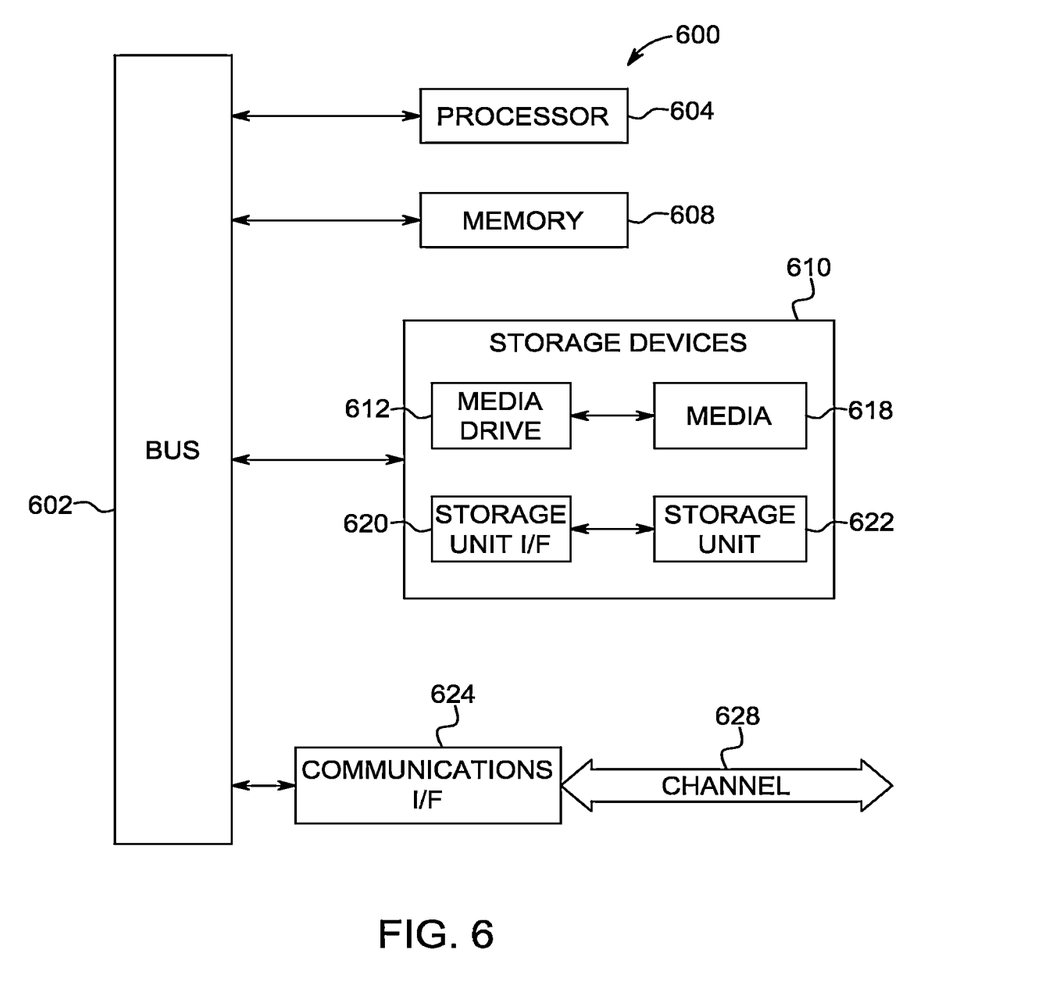
FIG. 6 illustrates an exemplary embodiment of a computing system capable of carrying out the functionality of the various embodiments.

FIG. 6 illustrates a typical computing system 600 that may be employed to implement processing functionality in embodiments of the invention. Computing systems of this type may be used in the BM-SC, the radio controllers, the base stations and the UEs, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 622 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage media 618, or storage unit 622. These and other forms of computer-readable media may store one or more instructions for use by processor 604, to cause the processor to perform specified operations. Such instructions, generally referred to as "computer program code" (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 622, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

All patents, applications, published applications and other publications referred to herein are incorporated by reference herein in their entirety, including the following references:

[1]. 3GPP TS 23.246, "Multimedia/Broadcast Multicast Service (MBMS) User Services; Stage 1", Release 6
[2]. 3GPP TS 26.346, "Multimedia/Broadcast Multicast Service (MBMS); Protocols and codecs", Release 6
[3]. 3GPP TR 29.846, "Multimedia/Broadcast Multicast Service (MBMS); CN1 procedures", Release 6
[4]. 3GPP TS 33.246, "Security of Multimedia Broadcast/Multicast Service", Release 6
[5]. 3GPP TS 25.346, "Introduction of the Multimedia Broadcast/Multicast Service (MBMS) in the Radio Access Network (RAN); Stage 2", Release 6
[6]. Internet Group Management Protocol, IGMPv2, http://www.ietf.org/rfc/rfc2236.txt
[7]. "Multicast Listener Discovery (MLD) for IPv6", http://www.ietf.org/rfc/rfc2710.txt
[8]. 3GPP TS 32.240, "Charging management; Charging architecture and principles", Release 6
[9]. 3GPP TS 24.008, "Mobile radio interface Layer 3 specification; Core network protocols; Stage 3", Release 6
[10]. 3GPP TS 29.060, "General Packet Radio Service (GPRS); GPRS Tunnelling Protocol (GTP) across the Gn and Gp interface", Release 6
[11]. 3GPP TS 25.331, "Radio Resource Control (RRC); Protocol specification", Release 6
[12]. 3GPP TS 23.809, "One Tunnel solution for Optimisation of Packet Data Traffic", Release 6
[13]. 3GPP TR 23.837, "Feasibility study for transport and control separation in the PS CN domain", Release 4
[14] 3GPP TS 23.060, "Technical Specification Group Services and System Aspects, General Packet Radio Service (GPRS) Service Description, Stage 2, v6.13.0, 2006-06

What is claimed is:

1. A user equipment (UE) comprising:
   a receiver;
   a transmitter; and
   a processor, operatively coupled to the receiver and the transmitter, wherein:
   the transmitter and the processor are configured to transmit, using a first radio access technology (RAT), a service request message including information associated with at least one UE service,
   the transmitter and the processor are configured to receive, based on the transmitted service request message, a message with information to setup a bearer for a second RAT, wherein the second RAT is a different RAT than the first RAT, and
   the receiver and the processor are configured to receive multimedia data using the second RAT and simultaneously receive data using the first RAT, wherein the multimedia data received over the first RAT and the second RAT use a same packet data protocol and same security keys to recover the multimedia data.

2. The UE of claim 1 wherein the simultaneously received data is control data.

3. The UE of claim 1 wherein the received multimedia data is received using the bearer for the second RAT.

4. The UE of claim 1 wherein communication using the first RAT uses frequency division duplexing and communication using the second RAT uses time division duplexing.

5. The UE of claim 1 wherein a coverage area of a base station that the UE is communicating with using the first RAT is larger than a coverage area of a base station that the UE is communicating with using the second RAT.

6. The UE of claim 1 wherein the transmitter and the processor, in response to determining a loss of service of the second RAT, are configured to inform the first RAT of the loss of service of the second RAT.

7. The UE of claim 1 wherein control plane data is received using the first RAT and user plane data is received using the second RAT.

8. The UE of claim 1 wherein the receiver and the processor are configured to receive signaling using the first RAT and the second RAT from a same mobility control node.

9. A method performed by a user equipment (UE), the method comprising:
  transmitting, using a first radio access technology (RAT), a service request message including information associated with at least one UE service,
  receiving, based on the transmitted service request message, a message with information to setup a bearer for a second RAT, wherein the second RAT is a different RAT than the first RAT, and
  receiving multimedia data using the second RAT and simultaneously receiving data using the first RAT, wherein the multimedia data received over the first RAT and the second RAT use a same packet data protocol and same security keys to recover the multimedia data.

10. The method of claim 9 wherein the simultaneously received data is control data.

11. The method of claim 9 wherein the received multimedia data is received using the bearer for the second RAT.

12. The method of claim 9 wherein communication using the first RAT uses frequency division duplexing and communication using the second RAT uses time division duplexing.

13. The method of claim 9 wherein a coverage area of a base station that the UE is communicating with using the first RAT is larger than a coverage area of a base station that the UE is communicating with using the second RAT.

14. The method of claim 9 further comprising in response to determining a loss of service of the second RAT, informing the first RAT of the loss of service of the second RAT.

15. The method of claim 9 wherein control plane data is received using the first RAT and user plane data is received using the second RAT.

16. The method of claim 9 further comprising receiving signaling using the first RAT and the second RAT from a same mobility control node.

* * * * *